Dec. 30, 1969 N. J. GIBSON ET AL 3,487,342
MAGNETIC REPULSION ACTUATED SWITCH
Filed Feb. 7, 1968
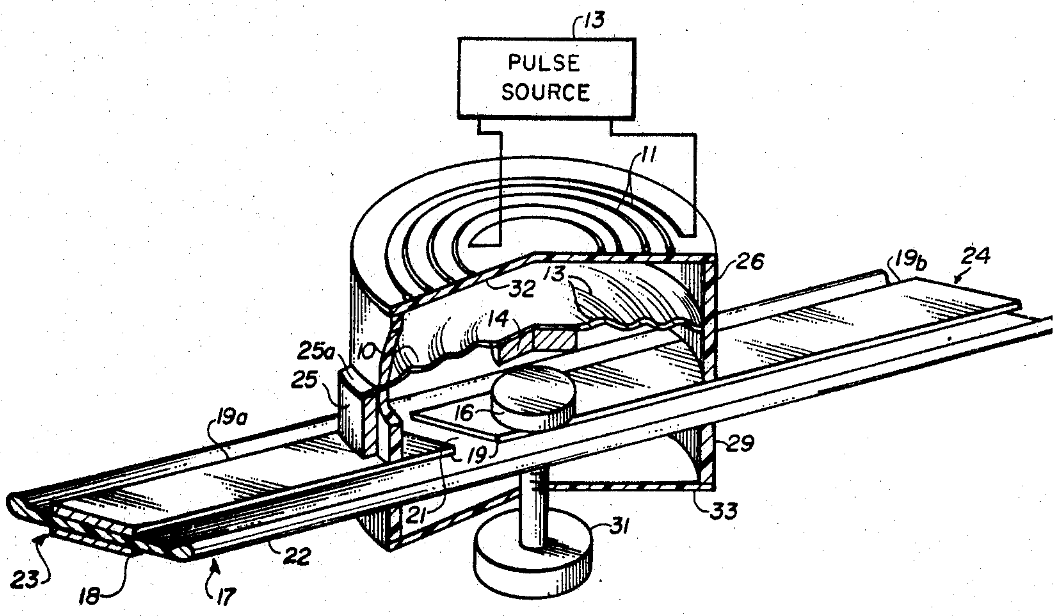
INVENTOR.
NEIL J. GIBSON
HOWARD M. GRAHAM
BY
ATTORNEY

United States Patent Office 3,487,342
Patented Dec. 30, 1969

3,487,342
MAGNETIC REPULSION ACTUATED SWITCH

Neil J. Gibson, Berkeley, and Howard M. Graham, Livermore, Calif., assignors to the United States of America as represented by the United States Atomic Energy Commission Filed Feb. 7, 1968, Ser. No. 703,654
Int. Cl. H01h 53/00
U.S. Cl. 335—5 9 Claims

ABSTRACT OF THE DISCLOSURE

Pulse transmission line switch in which a flexible bridging segment carrying contacts and disposed serially in a transmission line is actuated by eddy current repulsion forces to close a transmission line circuit.

Background of the invention

This invention relates to electromagnetically actuated switches, and more particularly to an eddy current repulsion switch especially suitable for providing a matched impedance serial or parallel transmission system switch.

In the operation of lasers and electro-optical light modulators, it is desirable to utilize pulsed power sources exhibiting low impedance characteristics for energizing the devices. Additionally, it is often necessary to transport such pulsed power between the source thereof and a loading element over a matched low impedance transmission line having a switching device serially inserted therein. To achieve optimum performance of such a system, i.e., an exceedingly fast rise-time pulse at the load element, it is essential that the impedance of the transmission line, including the serial switching device, be uniformly continuous and closely matched to the source and loading element. In cases where the loading element has an impedance of 50 ohms or more, coaxial transmission lines, together with conventional serial switching devices such as thyratrons and controlled rectifiers, provide a satisfactory impedance matched system, thus insuring a fast response at the load. However, where it is desired to use light modulator cells, e.g., Kerr cells, gallium arsenide light sources or other semiconductor devices as the load element, wherein the load impedances thereof are on the order of 10 ohms, the above-mentioned relatively high impedance switching devices are unsuitable. In order to achieve optimum response with these low impedance load elements, it is necessary to resort to a flat "strip" transmission line configuration or a multiplicity of parallel coaxial lines. While such "strip" transmission lines are readily available in the art, the serial incorporation of conventional high impedance switching devices such as a thyratron results in extreme signal response degradation due to the substantial impedance mismatch between the "strip" line and the switching device.

Summary of the invention

To provide a switching device according to the present invention, there is employed an electrically conducting nonmagnetic member provided with means for opening and closing a circuit in response to motion thereof and disposed to intercept a magnetic field pulse, whereby the member is positively and rapidly displaced due to the repulsive force arising between eddy currents generated in the member by the pulsed magnetic field and the magnetic field itself. In a preferred form of the invention, the electrically conducting member not only provides motion for operating a pair of contacts, i.e., means for opening and closing a circuit, but also provides a portion of the circuit being switched. This latter feature of the invention allows it to be used most advantageously with transmission systems and lines as discussed more fully hereinafter. Additionally, the switch can be employed for serially switching "strip" transmission lines into other transmission lines or lumped loads. It can furthermore be used as a switch between a plurality of parallel coaxial cables and a lumped load or a short-circuit; moreover, can be used as a transition switch for connecting "strip lines" to and from coaxial lines with suitable matching elements.

Accordingly, it is an object of this invention to provide a switching device which is readily adaptable for impedance matching with electrical transmission systems exhibiting a wide range of characteristic impedance values.

Other objects and features of advantage of the invention will become apparent from the following detailed description in connection with the accompanying drawing, in which:

Brief description of the drawing

The sole figure shows a pictorial cutaway view of the switching device of the invention coupled to a "strip" transmission line.

Description of the preferred embodiment

The switching device of the invention is described with specific reference to use in interrupting a "strip" line transmission system. As shown in the single figure of the drawing, the switching device of the invention includes a convoluted, thin, flexible and planar, electrically conducting diaphragm 10 arranged to be driven axially downward by a transient magnetic field pulse provided by spirally wound coil 11 disposed in close proximity to the upper side of diaphragm 10 upon energization by electrical current from pulse source 13. Member 10 is preferably of a resilient, flexible metallic material such as beryllium copper alloy. A contact 14, attached centrally to diaphragm 10, may thereby be driven to form a closed circuit with contact 16 disposed below diaphragm 10 as a serial switching, matched impedance segment of a "strip" transmission line system 17. More particularly, "strip" transmission line 17 is defined by parallel spaced, wide metallic strap or "strip" lower and upper conductors 18 and 19, respectively, which upper conductor 19 is separated into portions 19*a* and 19*b* by gap 21, across which gap 21 is arranged the switch of the invention The spacing between conductors 18 and 19 is determined by the thickness of insulator 22 disposed therebetween. The characteristic impedance of transmission line 17 is determined by the width of conductors 18 and 19, together with the separation therebetween provided by insulator 22, in accordance with well known principles, so as to match the input and output impedances. For best operation, it is necessary to maintain the characteristic impedance of transmission line 17 uniform throughout, when conductors 19*a* and 19*b* are electrically connected, providing electrical current transmission from end 23 to end 24 of transmission line 19, i.e., by a conductor path through conductor 25 mounted on inner end of conductor 19*a*, with tab 25*a* leading to the edge of member 10 and thence through contact points 14 and 16, so that the conductor path which bridges gap 21 provides, together with strip conductor 18, the same characteristic transmission line impedance as exhibited between conductors 18 and 19 along continuous parallel portions thereof. As a significant feature of this invention, the diameter of member 10 is made relatively large, e.g., two or three fold at least, in comparison with the width of conductor 19, to provide such characteristic impedance when contacts 14 and 16 are closed, i.e., with member 10 electrically bridging gap 21, even though member 10 is relatively distant from conductor 19, in the structural arrangement described above.

Means for supporting planar diaphragm member 10 with respect to "strip" line 17 may take the form of an annular insulating frame 26, secured by bonding adhesive or the like to the surface portions of line 17, to rigidly anchor the outer peripheral portions of member 10 with respect to line 17. Spiral coil 11 is conventionally wound on a discoidal insulator form 32, which insulator is in turn supported at the periphery by cylindrical insulator 26. A second cylindrical insulator form 29, firmly attached to the lower surface portion of "strip" line 17 coaxial with insulator form 26, provides a support for contact space adjuster screw 31 mounted in a threaded axial performation in discoidal support member 33 supported peripherally by insulator form 29. The upper end of adjustment screw 31 presses against the lower surface conductor 18 for displacing the end of strip line segment 19*b* adjacent gap 21, and carrying contact 16 mounted thereon toward contact 14, thus decreasing the separation between contact 16 and contact 14. As an advantageous feature of the invention, this adjustment means for varying the separation between contacts 16 and 14 not only provides for a wide range of operating voltages (the larger the separation, the higher the standoff voltage permitted between contacts 16 and 14), but also provides a fine adjustment during a closed state of the switch for varying the separation and the concomitant characteristic transmission impedance between conducting member 10 and strip conductor 19 which is dependent on the separation therebetween. The operation of the device of the invention in this instance provides, in response to a fast transient electrical pulse supplied by source 13, a momentary uniform impedance transmission path between end 23 and end 24 of strip transmission line 17. More specifically, the transient electrical pulse is applied across coil 11, thereby inducing a magnetic field pulse coaxially extending from coil 11. Due to the sharply rising intensity of the magnetic field and its proximity to member 10, eddy currents are induced therein in opposition to the magnetic field generated by current flowing in coil 11, effectively and strongly repulsing member 10 downward, away from coil 11. To provide for travel of contact 14 sufficient to traverse the normally open distance between contacts 16 and 14, a plurality of convolutions 13 are formed in member 10 which allow for axial extension thereof. Thus, upon receiving the initial repulsive force created by the induced eddy currents, the central portion of member 10 is rapidly forced downward such that contact 14 momentarily electrically engages contact 16. During this momentary engagement, electrical transmission is achieved directly through strip conductor 18 and through strip conductor portion 19*a* and conductor 25 to tab 25*a*, wherein tab 25*a* is an integral extension of member 10, through conducting member 10 to the centrally located contact 14, and from contact 14 to contact 16, and thus to strip conductor 19*b*. As discussed above, not only is electrical transmission from end 23 to end 24 provided upon switch closure, but in addition, this electrical transmission exhibits a uniform characteristic impedance, i.e., no impedance discontinuities are presented by the switch assembly.

As a further feature and advantage of the invention, it is noted that electrically conducting member 10, after receiving an initial repulsive force, develops sufficient momentum to carry contact 14 to an engaging or touching relationship with contact 16. Accordingly, pulse source 11 may be adjusted to provide a pulse width substantially smaller in time than the elapsed time required for member 10 and contact 14 to traverse the distance between contacts 14 and 16. Accordingly, such an adjustment allows extraneous interfering electrical signals from the pulse source and coil 11 to dissipate or attenuate before actual engagement of contacts 14 and 16, and thus effect serial closure of the transmission line. This feature is especially beneficial where precision signals are to be transmitted through the switch by line 17 during closure thereof, in which case spurious electromagnetic activity proximate line 17 during such transmission would otherwise interfere with the precision signals due to stray capacitive and inductive coupling effects.

The invention has been successfully operated with a 10-ohm transmission line system, wherein a rise time of shorter than $2 \times 10^{-9}$ secs. has been achieved for signals transmitted along line 17 and through the serial switching element. It is noted that, without the matched impedance feature of this invention, impedance discontinuities existing at the juncture of the switch with the transmission line would cause substantial signal reflective interference, thus degrading the rise time of the transmitted signal. On the other hand, with the matched impedance feature of the present invention, it has been possible to pulse, with fast response times, light modulator cells such as Kerr cells, gallium arsenide light sources and other low impedance semiconductor devices by capacitive discharge. In such a case, an initially charged capacitor is connected across conductors 19*a* and 18 at end 23, and the low impedance semiconductor loading element or device is connected across conductors 19*b* and 18 at end 24 of transmission line 17.

In operation, a short duration pulse is applied across coil 11 sufficient to initially impel member 10 carrying contact 14 toward contact 16, whereupon member 10 and contact 14 continue to travel ballistically toward contact 16, even though the energizing pulse applied to coil 11 may have already died out. At the end of the travel of contact 14 and engagement of contact 16 therewith, the initially charged capacitor (or fast discharge capacitor bank) generates an exceedingly fast rising voltage signal which travels along transmission line 17 through the switch, and excites the low impedance semiconductor load, wherein the fast rise time of the signal is preserved.

In a further embodiment of the invention, particularly applicable in connection with low voltage use, each of contacts 14 and 16 may be provided with mercury wetted surfaces for enhanced conductivity of the switch during closure.

Since the above disclosure has been by way of example rather than exhaustive of all the variations and modifications possible within the scope of the invention, it is intended that the following claims delineate my contribution to the art.

We claim:

1. A magnetically repulsion actuated switch, comprising:
   (a) a low inertia planar, electrically conductive member arranged for compliant displacement of at least a portion thereof;
   (b) means including a pair of contacts wherein one of said contacts is attached to said portion of the electrically conductive member arranged for compliant displacement to provide an electrically conductive path therethrough, and the other of said contacts mounted proximate said first contacts; and
   (c) means for generating a transient magnetic field pulse proximate said planar member to repulse and actuate the displacement of the compliant portion of said planar member and contact means attached thereto, and thereby closing both said contact means to provide said electrically conductive path therethrough.

2. A switch as defined in claim 1, wherein said electrically conductive path includes a second electrical conductive member comprising first and second segments arranged to define a gap therein; wherein said planar electrically conductive member is suspended in spaced relation to said second electrically conductive member; and wherein one of said pair of contacts is disposed in conductive relation to an end of the first of said conductor segments adjacent said gap, and the other of said contacts is disposed in conductive relation to the second segment of said conductive member.

3. A switch as defined in claim 2, wherein said segmented, electrically conductive member comprises a first conductor of a transmission line portion having a second conductor disposed in spaced parallel relation thereto; wherein said planar member is disposed in spaced parallel relation to said electrically conductive member, and is electrically connected to the first segment thereof; and wherein one of said pair of contacts is mounted on said planar member, and the second contact is mounted on the second segment of said electrically conductive member.

4. A switch as defined in claim 3, wherein said transmission line comprises strip transmission line including a first wide metallic strip or strap conductor arranged in insulated, spaced parallel relation to a second strap conductor; wherein said planar member comprises a convoluted flexible diaphragm member secured peripherally in spaced parallel relation to said strip transmission line; and wherein one of said pair of contacts is disposed centrally on said flexible diaphragm member in opposing relation to the second contact mounted on said second segment of the electrically conductive member.

5. A switch as defined in claim 4, wherein said means for generating a transient magnetic field pulse includes a planar coil disposed in coaxial, outwardly spaced relation to said flexible diaphragm.

6. The device recited in claim 5, further including an insulating frame supporting the periphery of said diaphragm in fixed relationship with said first and second portions of said first conductor.

7. The device of claim 6, further including a means for adjusting separation of said contact means in an open circuit condition.

8. The device of claim 7, wherein said adjusting means comprises an insulating frame rigidly mounted on said strip line opposite said diaphragm and adjacent said second conductor; and an insulating screw means engaging said frame and arranged so as to press against the second conductor and bend a portion of said transmission line toward said diaphragm, thereby changing the separation of said contacts, together with changing the distance between said second conductor and said diaphragm.

9. The device of claim 4, wherein said diaphragm is made relatively wider, and is displaced relative to said strip transmission line to define a transmission impedance between said diaphragm and second conductor during closure of said contact means approaching the characteristic impedance of said strip transmission line.

References Cited

UNITED STATES PATENTS

| | | | |
|---|---|---|---|
| 2,854,543 | 9/1958 | Wilson | 335—5 |
| 3,324,432 | 6/1967 | Ridler | 335—154 |
| 3,331,040 | 7/1967 | Woodhead | 335—196 |

BERNARD A. GILHEANY, Primary Examiner

HAROLD BROOME, Assistant Examiner